(12) United States Patent
Malay (10) Patent No.: US 6,368,745 B1
(45) Date of Patent: Apr. 9, 2002

(54) BATTERY CONSTRUCTION HAVING COVER ASSEMBLY

(75) Inventor: Manuel R. Malay, Brunswick, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/598,559

(22) Filed: Jun. 21, 2000

(51) Int. Cl.⁷ .............................. H01M 2/04; H01M 2/08
(52) U.S. Cl. ...................... 429/175; 429/174; 429/176
(58) Field of Search ................................ 429/175, 176, 429/174

(56) References Cited

U.S. PATENT DOCUMENTS 3,615,861 A * 10/1971 Braem
3,841,913 A * 10/1974 Anderson
4,469,764 A * 9/1984 Schumm, Jr. ............ 429/174 X
6,294,281 B1 * 9/2001 Tucholski et al. ...... 429/174 X

* cited by examiner

Primary Examiner—John S. Maples
(74) Attorney, Agent, or Firm—Stewart A. Fraser (57) ABSTRACT

A battery comprising a steel can having a bottom end, an open top end, and side walls extending between the top and bottom ends. Positive and negative electrodes are disposed in the can. An outer cover is disposed over the open end of the can. The outer cover has an outer flange disposed on the outside of the can walls and an inner flange disposed on the inside of the can wall. A seal is disposed between the can and the outer cover so that the seal is disposed against the inner and outer flanges of the outer cover. The outer cover is preferably crimped against the can wall to compress the seal between the inner and outer flanges and the container, thereby minimizing axial loading on the can and allowing for use of a thin gauge can.

17 Claims, 9 Drawing Sheets

BATTERY CONSTRUCTION HAVING COVER ASSEMBLY

BACKGROUND OF THE INVENTION

The present invention generally relates to batteries, e.g., electrochemical cells, and more particularly to a low profile closure assembly for closing and sealing the open end of a battery container.

Figure 1:
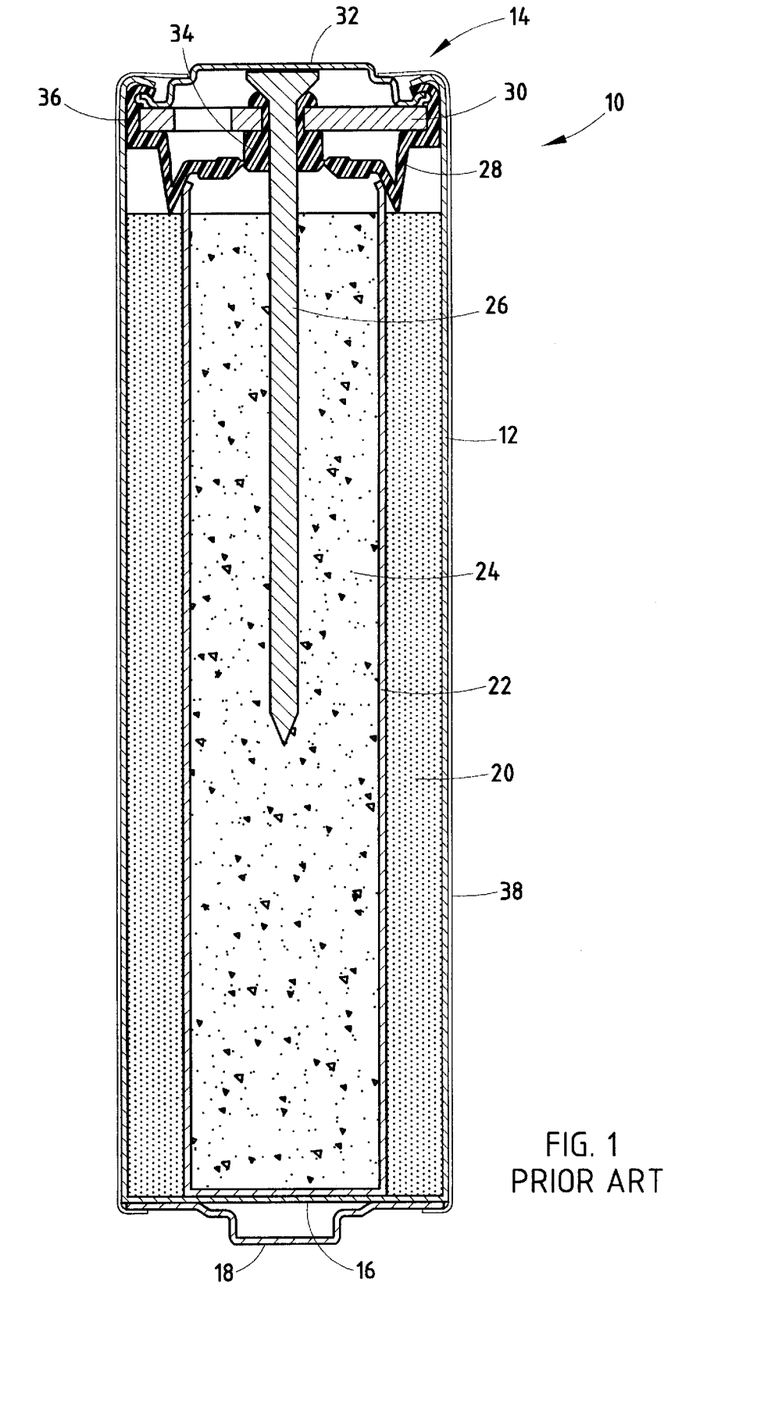
FIG. 1 is a longitudinal cross-sectional view of a AA-size alkaline electrochemical battery employing a conventional cover assembly.

FIG. 1 illustrates the construction of a conventional AA-size alkaline battery 10 utilizing a typical battery can closure assembly. As shown, conventional battery 10 includes a cylindrical-shaped steel can 12 having an open top end 14, a closed bottom end 16, and side walls extending between the top and bottom ends. The closed bottom end 16 of steel can 12 includes a protruding nub 18 formed at its center region and contacting the steel can 12 to serve as the positive contact terminal of battery 10.

The conventional battery 10 shown is an electrochemical cell further having a positive electrode material 20, commonly referred to as the cathode, which comprises manganese dioxide as the active material. The cathode 20 may be preformed and inserted into steel can 12, or may be molded in place, so as to contact the inner surface of can 12. After the positive electrode 20 has been provided in steel can 12, a separator 22 is inserted into the space defamed by the interior walls of the positive electrode 20. Separator 22 is typically made of a non-woven fabric and serves to provide physical separation between the positive electrode 20 and a negative electrode 24. The negative electrode 24, commonly referred to as the anode, is centrally disposed in the steel can 12 and comprises zinc powder as the active material. An alkaline electrolyte, a solution of aqueous potassium hydroxide (KOH), is further disposed in the steel can 12.

Once the electrodes 20 and 24, separator 22, and alkaline electrolyte have been disposed inside steel can 12, a preassembled collector assembly is inserted into the open end of steel can 12. To accommodate the insertion of the collector assembly, the steel can 12 is typically either slightly flared at its open end 14 or includes an inwardly extending bead or step to support the collector assembly in a desired orientation. The conventional collector assembly includes a current collector nail 26, a nylon seal 28, an inner metal cover 30, and an outer metal cover 32. The current collector nail 26 extends into the anode 24 and has an enlarged head that is welded or otherwise in electrical contact with outer metal cover 32. Current collector 26 extends through an opening formed in a central hub 34 of seal 28. The inner cover 30, which is formed of rigid metal, is disposed between the central hub 34 and peripheral upstanding wall 36 of seal 28 to increase the rigidity and support the radial compression of the collector assembly, thereby improving the sealing effectiveness. By configuring the collector assembly in this fashion, the inner metal cover 30 serves to enable compression of the central hub 34 against current collector 26, while also supporting compression of the peripheral upstanding wall 36 of seal 28 against the inner surface of the steel can 12.

After the collector assembly has been inserted in the open end 14 of can 12, the assembly is secured in place by radially squeezing the side walls at the open end 14 of the steel can 12 inward against the collector assembly and outer cover 32, and crimping the open end edge of the can 12 over the peripheral lip of the collector assembly and outer cover 32 to secure the outer cover and collector assembly within the open end of the can 12. Thereafter, a metalized, plastic film label 38 is formed about the exterior surface of steel can 12, except the ends of steel can 12. Label 38 is formed over the peripheral edge of the bottom end 16 of can 12 and partially extends onto the outer negative cover 32.

The conventional crimping process bends the open end of the can 12 ninety degrees onto the outer cover 32 and, in doing so, subjects the can 12 to an axial load. In order to withstand the conventional crimping of the can over the collector assembly, the steel can 12 must be strong enough to prevent can deformation, such as buckling of the side walls and being at the bottom of the can, caused by the axial compression forces that are typically experienced during the crimping operation. To withstand the axial load during crimping, the conventional AA-size battery typically requires a steel can having a thickness of about ten mils.

Although the above-identified collector assembly performs all the above-noted desirable functions satisfactorily, as apparent from its cross-sectional profile, this particular collector assembly and the steel can occupy a significant amount of space within the interior of the battery 10. Because the exterior dimensions of the battery are generally fixed by the American National Standards Institute (ANSI), the greater the space occupied by the steel can 12 and collector assembly, the less space that there is available within the battery 10 for the electrochemical materials. Consequently, a reduction in the amount of electrochemical materials that may be provided within the battery results in a shorter service life for the battery. It is therefore desirable to maximize the interior volume within a battery that is available for the electrochemically active components. It is further desirable to construct a battery so that the space occupied by the collector assembly and the space occupied by the battery can are minimized, while still maintaining adequate sealing characteristics. It is yet further desirable to minimize axial load applied to the battery can during can closure.

SUMMARY OF THE INVENTION

The present invention allows for the use of a thinner gauge can which increases the volume available for active materials in a battery. Another aspect of the present invention provides a collector assembly that effectively seals the open end of the battery container with enhanced manufacturability, reduced cost, and improved current collector alignment. To achieve these and other advantages, and in accordance with the purpose of the invention as embodied and described herein, the present invention provides for a battery employing a container having a bottom end, an open top end, and side walls extending between the top and bottom ends. Positive and negative electrodes are disposed in the container. An outer cover is disposed over the open end of the container. The outer cover has an outer flange extending on the outside of the container side walls and an inner flange extending on the inside of the container side walls. A seal is disposed between the container and the outer cover so that the seal is disposed against the inner and outer flanges of the outer cover. The outer cover is preferably crimped against the container side walls to compress the seal between each of the inner and outer flanges and the container.

According to another aspect of the present invention, a method of assembling a battery is provided. The method includes forming a container having an open top end, a bottom end, and side walls extending between the top and bottom ends. The method also includes forming a cover having an outer peripheral flange and an inner flange, with a channel provided therebetween. The method further includes dispensing active battery materials in the container, and placing the cover over the open top end of the container so that the outer and inner flanges are on opposite sides of the container side walls and the container and outer cover are separated by a seal. The method further includes forcing the outer and inner flanges of the outer cover against the seal so as to compress the seal between the container and the outer cover.

The resultant closure assembly advantageously provides for a simplified technique for closing the open end of the battery can, while providing enhanced sealing and allowing for a reduced thickness can due to minimal axial closing forces. Accordingly, the battery may employ a thinner battery can, as compared to conventional battery cans.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 2:
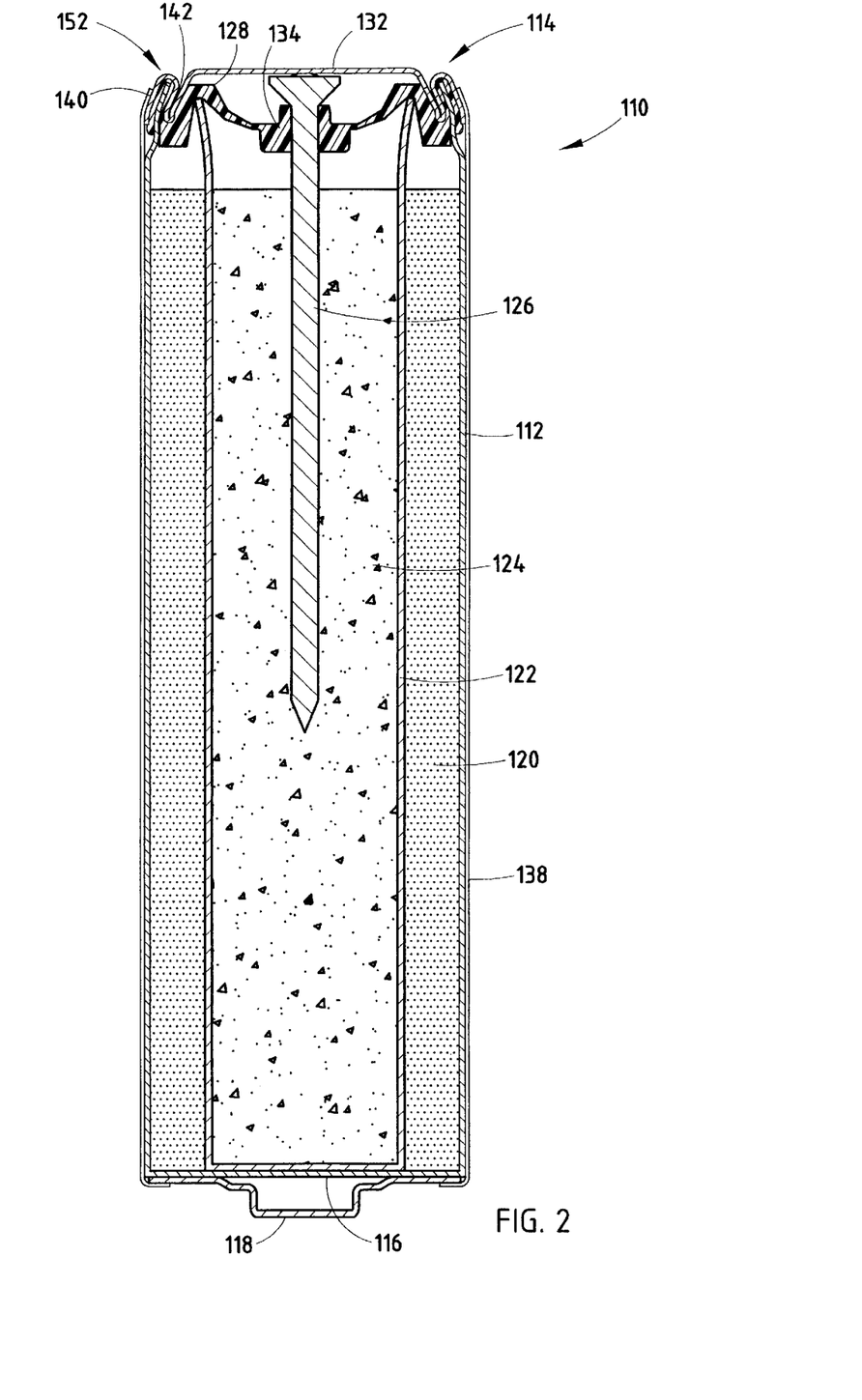
FIG. 2 is a longitudinal cross-sectional view of an electrochemical battery employing a cover assembly according to a first embodiment of the present invention.

Referring to FIG. 2, a cylindrical alkaline battery 110 is shown therein having a sealed closure for closing the open end of the battery container according to a first embodiment of the present invention. The battery 110 includes a cylindrical steel can 112 having a closed bottom end 116, an open top end 114, and side walls extending between the top and bottom ends. The closed bottom end 116 of steel can 112 includes a protruding nub 118 formed at its center region for providing the positive contact terminal of battery 110. While the positive contact terminal 118 is shown welded or otherwise attached to a flat bottom end of the steel can 112, it should be appreciated that terminal 118 alternately may be integrally formed in the bottom end 116 of steel can 112.

Assembled to the open top end 114 of steel can 112, is a cover assembly 152, also referred to as a collector assembly, which seals closed the open end 114 of steel can 112. The cover assembly 152 includes a polymeric seal 128, an outer metal cover 132, and a current collector 126. The cover assembly 152 may be preassembled and disposed in the open end of steel can 112 as a single unit. The polymeric seal 128, which may comprise nylon, has a central hub 134 with a central axial opening formed therein for receiving the elongated shaft of current collector 126. Seal 128 extends radially from central hub 134 to the outer periphery where it is compressed and sealed against the outer cover 132 and steel can 112. In addition, seal 128 may include a pressure release mechanism (not shown) which is ventable to release high pressure gases from within the sealed volume of the can 112 upon reaching a predetermined pressure.

The outer negative cover 132 is positioned over the top of seal 128 and has an outer peripheral flange (wall) 140 and an inner peripheral flange (wall) 142. The outer peripheral flange 140 of outer cover 132 is a single metal thickness wall that extends partially along the outside open end side walls of steel can 112, while the inner flange 142 is a hem-type (rolled back) double metal thickness wall that extends along the inside open end side walls of steel can 112. Accordingly, the outer and inner flanges 140 and 142 are on opposite sides of steel can 112 and compress seal 128 between steel can 112 and each of inner and outer flanges 140 and 142 to provide a large sealed surface area with a long leakage resistance path, to prevent leakage of electrolyte from within steel can 112.

A metalized, plastic film label 138 is formed about the exterior surface of steel can 112, except for the ends of steel can 112. Film label 138 is formed over the peripheral edge of the bottom end 116 of steel can 112 and partially extends onto the outer flange 142 of outer cover 132 as shown.

The battery 110 is shown as an alkaline electrochemical cell having a cathode 120 formed about the interior surface of steel can 112, a separator 122 disposed about the interior surface of cathode 120, and an anode 124 disposed with an electrolyte into the separator 124 and in contact with the current collector 126. The anode 124, cathode 120, and separator 122 may be formed using various known techniques and may include various known electrochemical materials as are commonly employed in the battery art. According to the embodiments shown, the cathode 120 is configured as the positive electrode, and the anode 124 is configured as the negative electrode.

Figure 3:
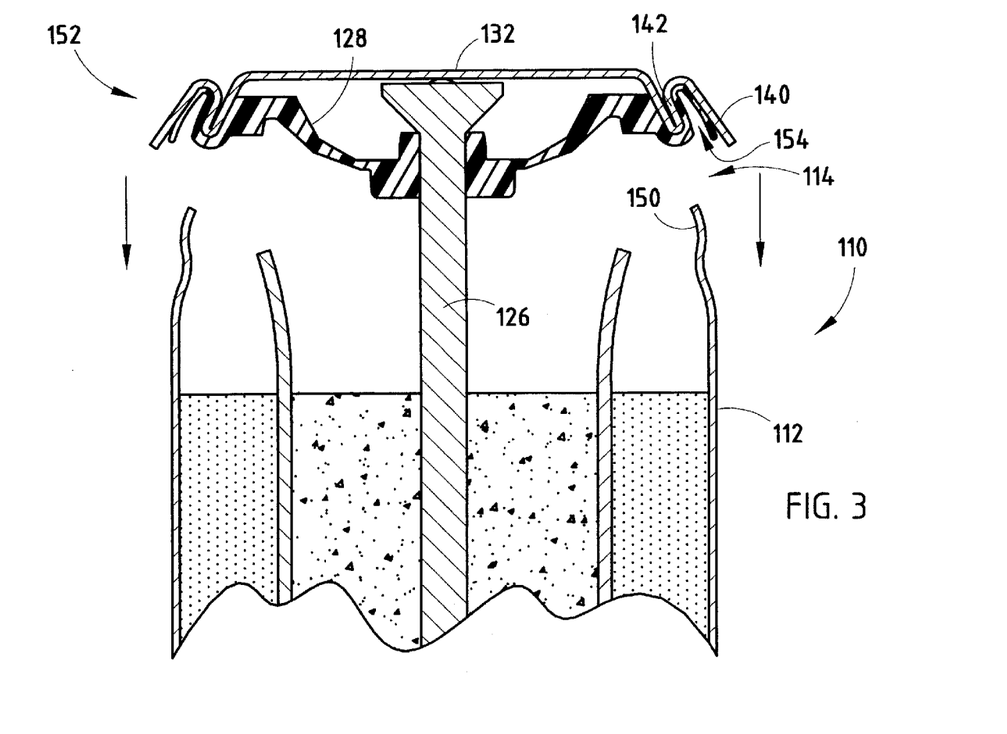
FIG. 3 is partial cross-sectional view of the battery in FIG. 2 illustrating assembly of the cover assembly.

Referring to FIGS. 3–6, the assembly of the cover assembly 152 is illustrated therein according to the first embodiment. Once the electrochemically active materials, including the cathode 120 and the anode 124, as well as the separator 122 and alkaline electrolyte, have been dispensed within the steel can 112, the open end 114 of steel can 112 is ready for closure. The closure assembly 152, which is shown as a preassembled unit made up of the outer cover 132, seal 128, and current collector 126, is then disposed onto the open end 114 of steel can 112 as shown in FIG. 3. The outer cover 132 and seal 128 are formed to include a channel 154 between outer flange 140 and inner flange 142 for receiving the open end 114 of steel can 112. The cover assembly 152 rests on the open top rim of the side walls at the open end 114 of steel can 112 such that the top rim of can 112 is inserted into channel 154. According to the first embodiment, the steel can 112 is slightly angled inward along open end section 150. In addition, the flanges 140 and 142 are both angled such that channel 154 is similarly angled inward to conform to the angled steel can 112. The angled double layer inner flange 142 serves to compress seal 128 against outer cover 132, and thereby eliminates the need for a separate inner cover. It should be appreciated that by disposing the outer cover 132 so that it rests on the upper rim of steel can 112, the cover assembly is properly oriented so that the current collector 126 extends vertically into the center of anode 126.

Figure 4:
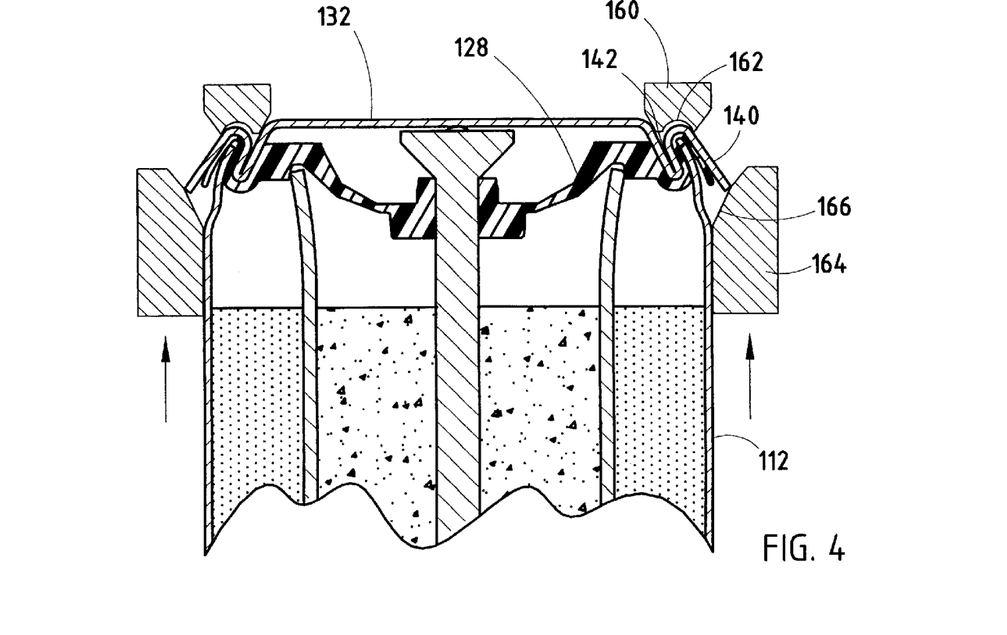
FIG. 4 is a partial cross-sectional view of the battery in FIG. 2 further illustrating closure of the battery can.
Figure 5:
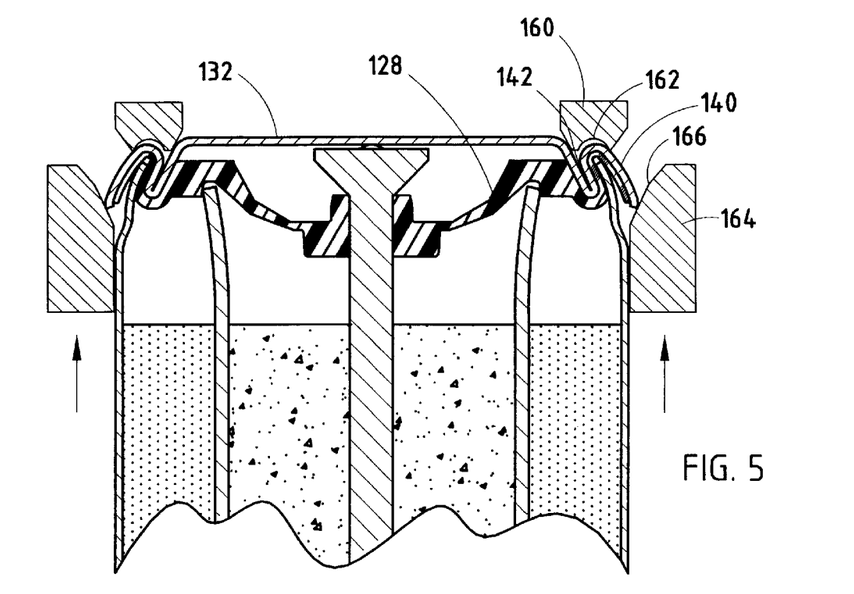
FIG. 5 is a partial cross-sectional view of the battery in FIG. 2 further illustrating closure of the battery can.
Figure 6:
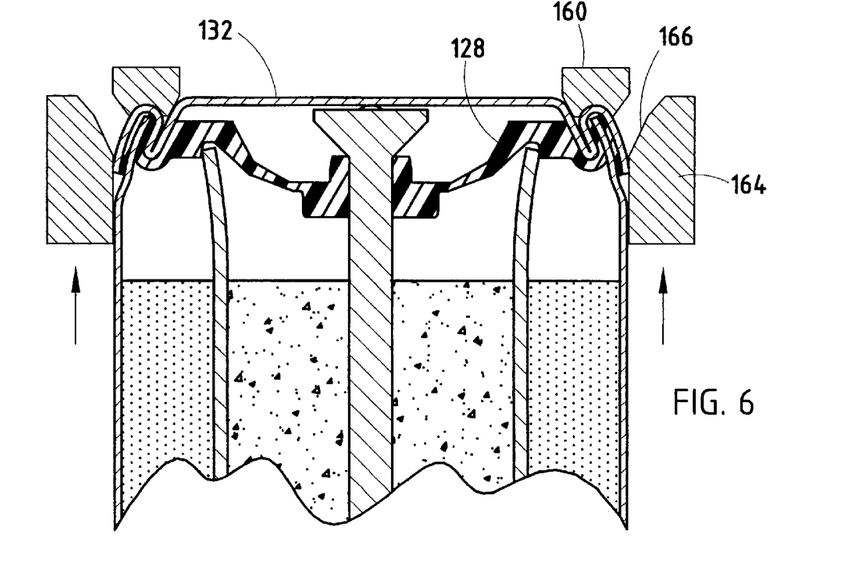
FIG. 6 is a partial cross-sectional view of the battery in FIG. 2 further illustrating closure of the battery can.

Once the cover assembly 152 is disposed onto the open end 114 of steel can 112, the outer cover 132 is crimped radially inward against the open end side walls of steel can 112 as shown in FIGS. 4–6. With particular reference to FIG. 4, a sealed closure of the steel can 112 is achieved by employing a support die 160 and a split crimp die 164. Support die 160 is ring-shaped and has an arcuate bottom surface 162 for supporting a top surface of outer cover 132 above the outer and inner flanges 140 and 142. Split crimp die 164 is generally cylindrical and is disposed along the side walls of the steel can 112. Die 164 has an angled surface 166 for forcing the outer flange 140 of cover 132 radially inward as the cover 132 moves relative to die 164. Either one or both of support die 160 and split crimp die 164 may move axially toward one another so that the angled surface 166 forcibly engages the outer flange 140 of outer cover 132. According to one embodiment, split crimp die 164 moves upward, while support die 162 is held fixed in place relative to outer cover 132. Referring to FIG. 5, the outer flange 140 of outer cover 132 is forced radially inward such as to compress seal 128 between outer flange 140 and inner flange 142 of outer cover 132. As further shown in FIG. 6, the split crimp die 164 completes the closure of outer cover 132. It should be appreciated that by radially crimping the outer cover 132 against the side walls of steel can 112, minimal axial forces are applied to steel can 112, and a large sealing area with a long leakage resistance path is provided between compressed seal 128 and steel can 112 so as to minimize any leakage therethrough. It should further be appreciated that the aforementioned crimping process can occur such that substantially no axial load is applied to steel can 112.

Figure 7:
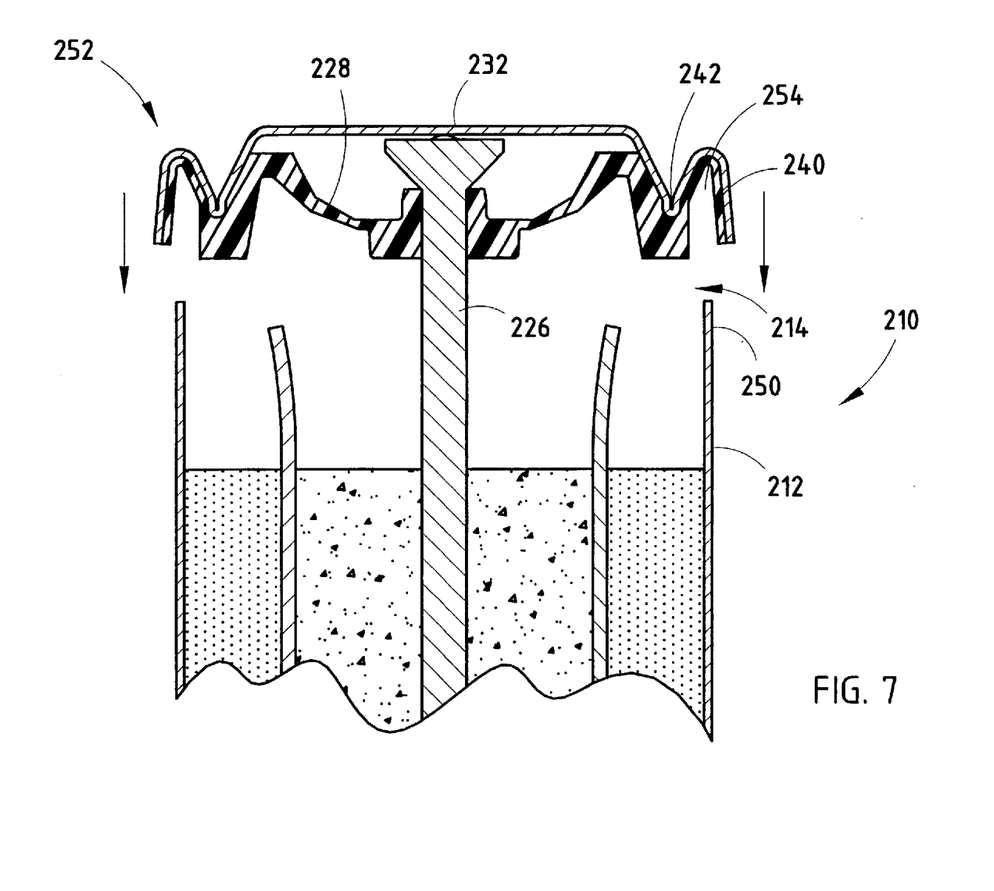
FIG. 7 is a partial cross-sectional view of a battery illustrating assembly of a cover assembly according to a second embodiment of the present invention.

Referring to FIG. 7, a cover assembly 252 is shown according to a second embodiment of the present invention for closing a steel can 212 that has substantially continuous straight side walls at the open end 214, in contrast to the inward angled side wall section 150 of the first embodiment. The cover assembly 252 likewise employs an outer cover 232 having a double metal thickness inner flange (wall) 242 and a single metal thickness outer flange (wall) 240. Outer cover 232 receives a seal 228 that conforms to the outer and inner flanges 240 and 242 and provides a channel 254 between outer and inner flanges 240 and 242. The channel 254 extends substantially vertical so as to conform to the straight side wall section 250 at the open end 214 of steel can 212. The cover assembly 252 is disposed onto the open end 214 of steel can 212 so that the channel 254 rests on top of the upper rim of steel can 212.

Figure 8:
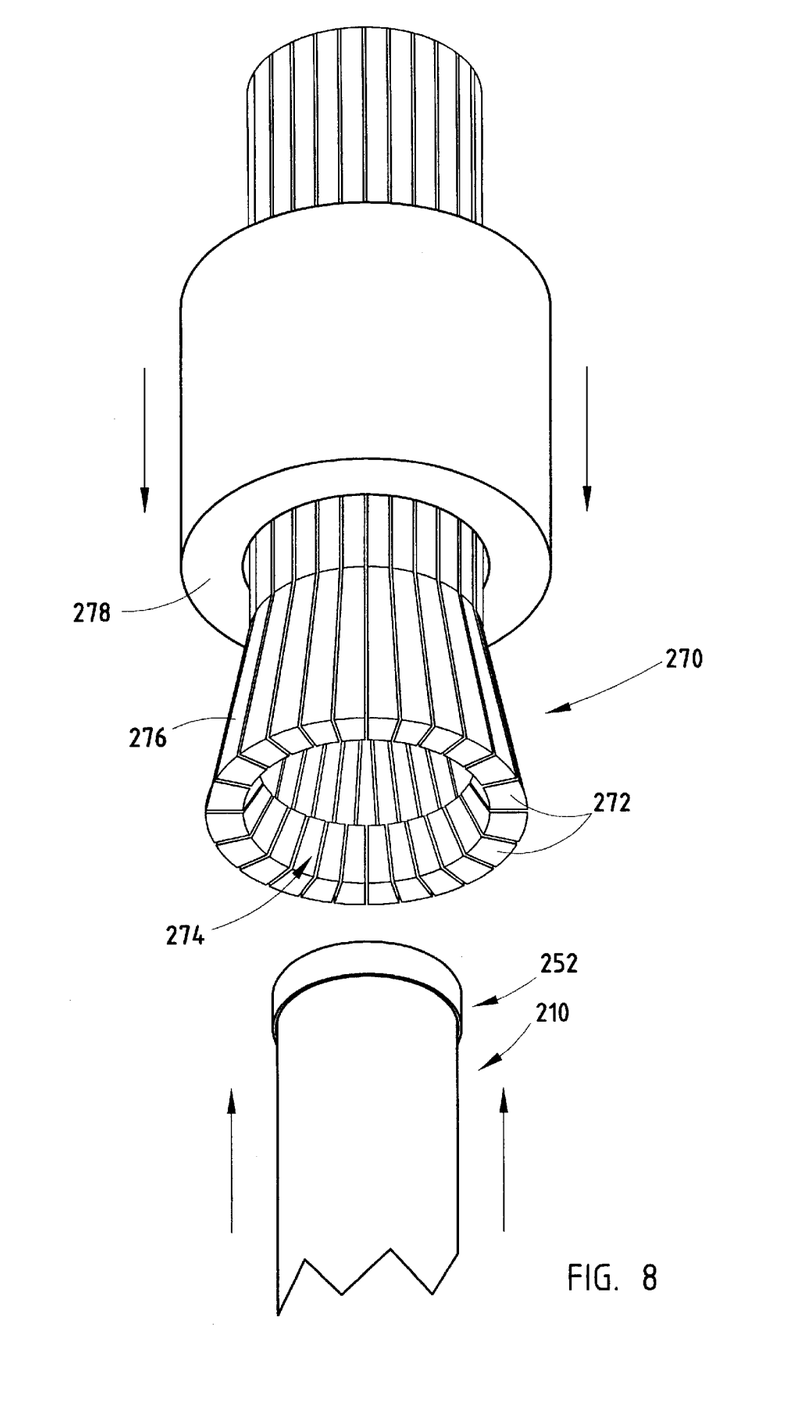
FIG. 8 is a perspective view of a collet tool for closing the battery can in FIG. 7.
Figure 9:
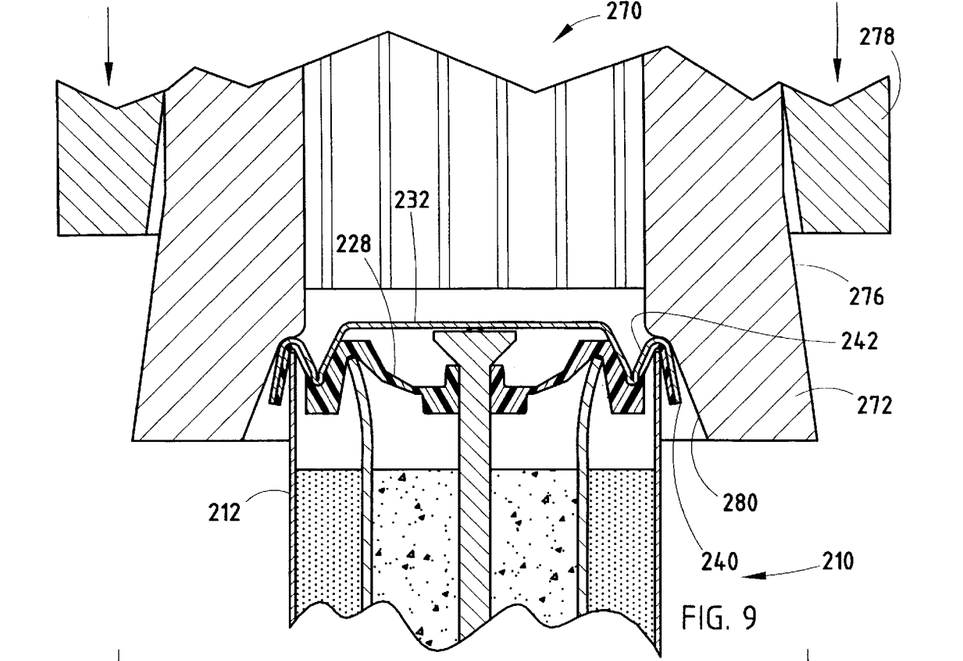
FIG. 9 is a partial cross-sectional view of the battery installed in the collet tool in FIG. 8.
Figure 10:
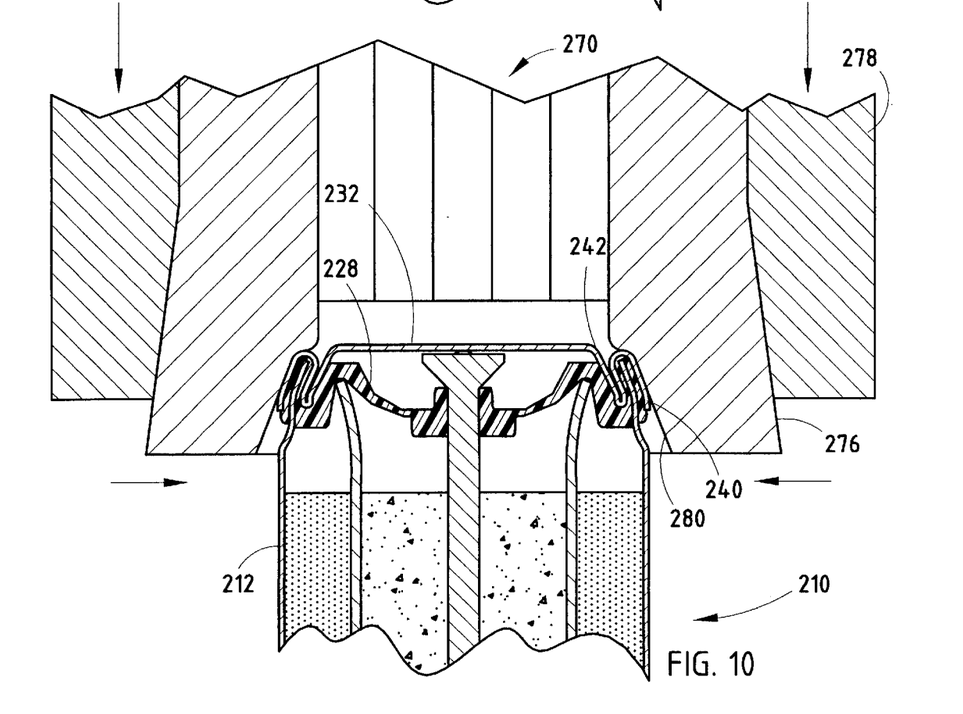
FIG. 10 is a partial cross-sectional view of the battery and collet tool in FIG. 8 further illustrating closure of the battery can.

The cover assembly 252 of the second embodiment is preferably closed with a collet-type crimping tool 270 as shown in FIGS. 8–10. With particular reference to FIG. 8, the collet-type crimping tool 270 has a plurality of shaped fingers 272 for squeezing the outer flange 240 of outer cover 232 radially inward. According to the example shown, crimping tool 270 has twenty-four equiangularly spaced fingers 272. The plurality of shaped fingers 272 each have a shaped inside surface 280 at one end, and together define an opening 274 for receiving the cover assembly 252 and the open end of steel can 212 as is further shown in FIG. 9. A cylindrical actuator sleeve 278 is disposed about the outside walls of fingers 272 and is axially movable to engage a tapered outside surface 276 on the fingers 272 so as to compress the fingers 272 radially inward together when the actuator sleeve 278 is forced axially downward. When the fingers 272 close together, the shaped surface 280 compresses the outer flange 240 radially inward so as to crimp the outer cover 232 against the side walls of steel can 212. The closing operation of the collet-type crimping tool 270 is further shown in FIG. 10 in the fully crimped position with the outer cover 232 and seal 228 sealing closed the open end of the can 212. Following the crimping operation, the actuator sleeve 278 is raised and the fingers 272 return to the open position such that the closed battery can be removed from the tool 270.

Figure 11:
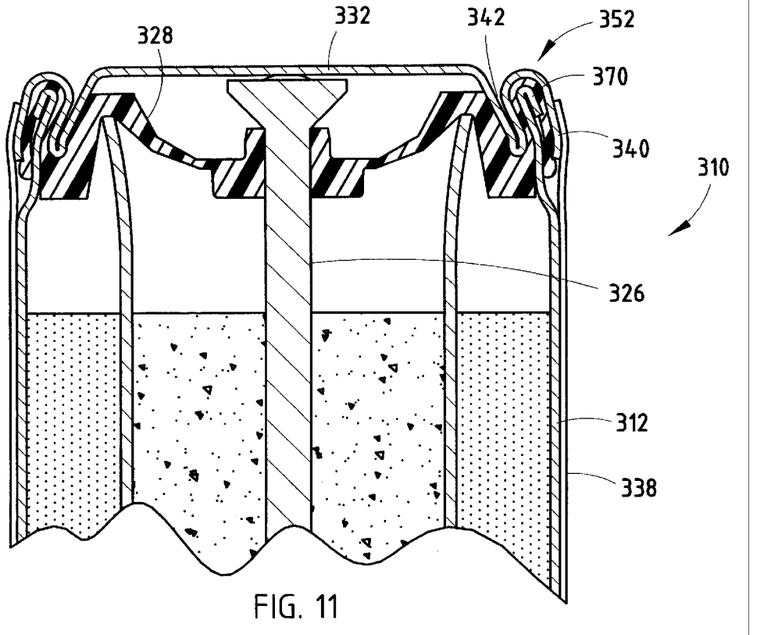
FIG. 11 is a longitudinal cross-sectional view of an electrochemical battery having a cover assembly according to a third embodiment of the present invention.

Referring to FIG. 11, a battery 310 is shown having a cover assembly 352 according to a third embodiment of the present invention. Cover assembly 352 includes an outer cover 332, a seal 328, and a current collector 326. The cover assembly 352 is inserted onto the open end of a steel can 312 and the outer cover 332 is crimped radially inward to compress seal 328 against the steel can 312. The outer cover 332 likewise includes a double metal thickness inner flange (wall) 342 and a single metal thickness outer flange (wall) 340 disposed on opposite sides of steel can 312 for compressing the seal 328 therebetween. According to the third embodiment, the upper end of steel can 312 includes a rolled back open end 370 in which the upper open end of can 312 is folded one hundred eighty degrees radially outward and back onto itself to provide a double metal thickness. The rolled back open end 370 provides for an increased crimp release pressure.

Figure 12:
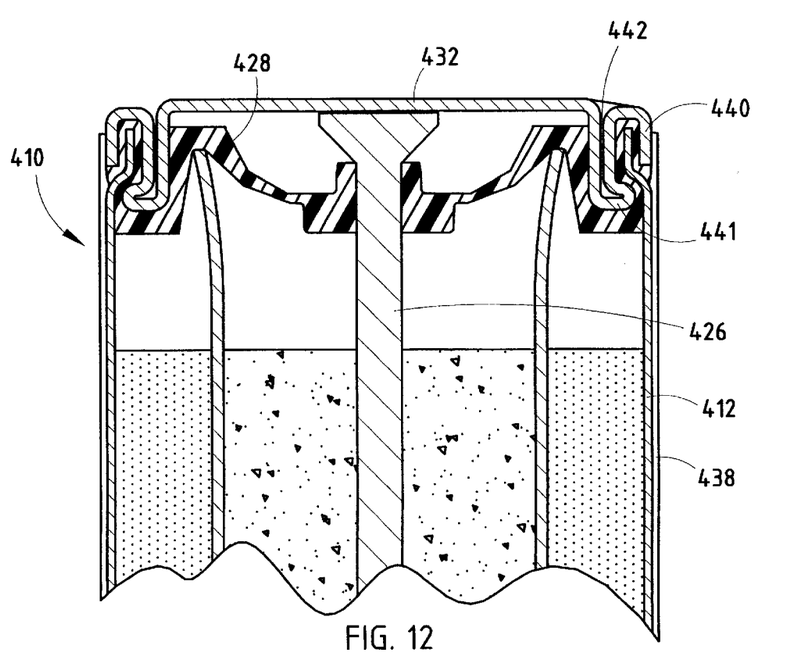
FIG. 12 is a longitudinal cross-sectional view of an electrochemical battery having a closure assembly according to a fourth embodiment of the present invention.

Referring to FIG. 12, a battery 410 is shown having a cover assembly 452 according to a fourth embodiment of the present invention. The cover assembly 452 includes an outer cover 432, a seal 428, and a current collector 426. The outer cover 432 has a double metal thickness outer flange (wall) 440 and a single metal thickness inner flange (wall) 442 disposed on opposite sides of the open end of a steel can 412. In addition, the outer cover 432 further has a horizontal section 441 formed at the bottom of inner flange 442 and orthogonal to inner flange 442. Horizontal section 441 likewise provides for increased crimp release pressure.

Figure 13A:
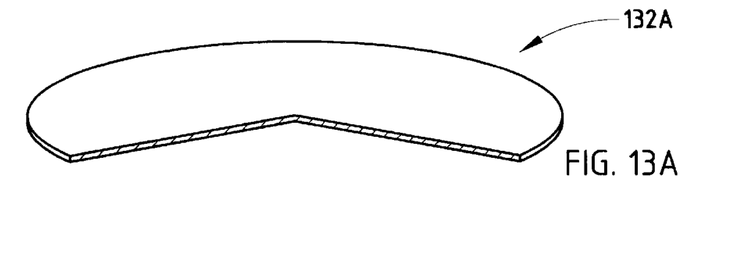
FIGS. 13A–13E illustrate a sequence of steps for forming the outer negative cover according to the first embodiment.
Figure 13B:
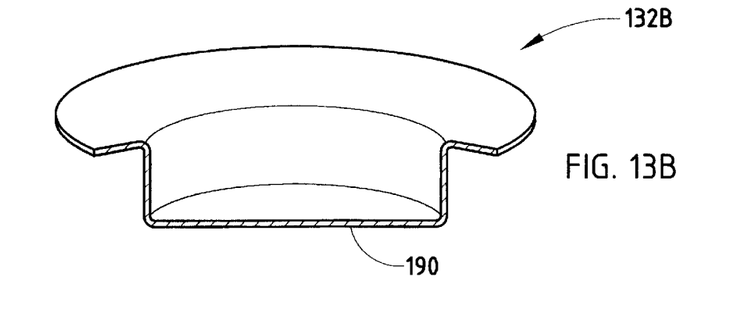
Figure 13C:
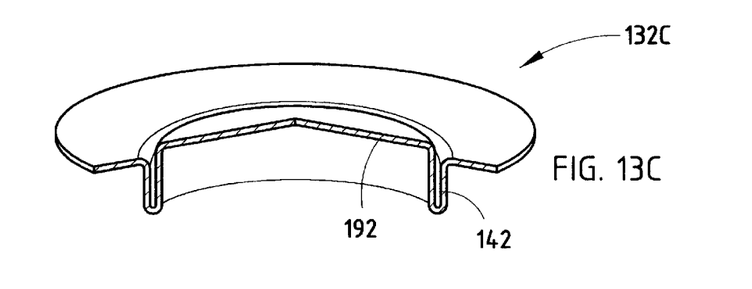
Figure 13D:
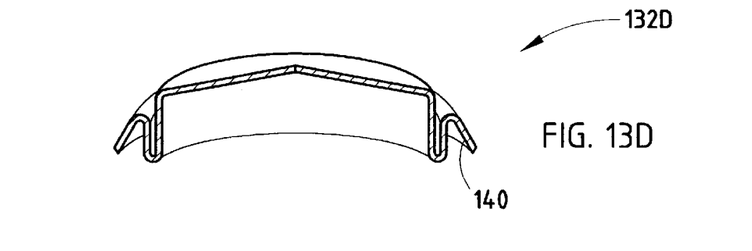
Figure 13E:
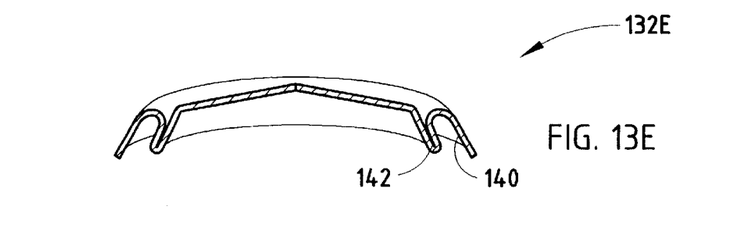

Referring to FIGS. 13A–13E, the formation of the outer cover 152 with a sliding die transfer press technique is shown, according to one embodiment. Referring to FIG. 13A, a flat circular metal blank sheet 132A is provided as the starting piece. A central circular portion 190 of the circular blank piece 132A is cupped downward as shown in FIG. 13B, and a reverse draw is performed to form a raised portion 192 and inner flange 142, as shown in FIG. 13C. The outer flange 140 is formed thereafter in FIG. 13D. Finally, the inner flange 142 is flared outward in the final step shown in FIG. 13E. The outer metal cover 132 may be easily formed as shown, and then assembled onto the open end of the steel can and crimped to seal closed the battery can. It should be appreciated that other methods of manufacturing any of the outer covers 132, 232, 332, and 432 may be employed, including progressive transfer press methods.

Accordingly, the present invention provides for a cover assembly assembled to the open end of a steel can for sealing closed the open end of the battery can. The cover assembly and closing technique advantageously allow for a reduced thickness steel can by eliminating or minimizing axial forces that are generally present in conventional closing techniques. In addition, the cover assembly occupies minimal volume within the battery can. Accordingly, the reduced can thickness and reduced volume consumption of the cover assembly allow for increased amounts of active battery materials, thereby leading to enhanced battery performance. Further, the cover assembly provides a fully constrained seal that minimizes the possibility of leakage, and eliminates the need for an additional supportive inner cover. Further, the cover assembly is easy to assemble to a battery can and provides high reliability for current collector alignment.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A battery comprising:
    a container for containing battery materials including positive and negative electrodes, said container having a first end, an open second end, and side walls extending between said first and second ends;
    an outer cover positioned across the open second end of said container, said outer cover having an outer peripheral flange and an inner flange and a channel formed between the outer peripheral flange and the inner flange, wherein the channel receives the open end of the container such that the outer flange and inner flange are on opposite sides of the side walls of the container; and
    a seal disposed between the outer cover and the container, wherein said seal is compressed between the inner flange and the container and is compressed between the outer flange and the container.

2. The battery as defined in claim 1, wherein said outer cover is assembled to said container by compressing the inner and outer flanges relative to each other.

3. The battery as defined in claim 2, wherein said container has a substantially straight side wall prior to compressing the inner and outer flanges.

4. The battery as defined in claim 1, wherein said container has a side wall that angles inward at the open end of the container.

5. The battery as defined in claim 1, wherein said inner flange comprises a double metal thickness.

6. The battery as defined in claim 1 further comprising a current collector electrically coupled to the outer cover.

7. The battery as defined in claim 6, wherein said seal has a central hub with an opening for receiving said current collector.

8. The battery as defined in claim 7, wherein said battery does not contain an inner cover disposed between the hub and an outer peripheral wall for supporting the seal.

9. The battery as defined in claim 1, wherein said container further includes a rolled back edge formed at the open end.

10. The battery as defined in claim 1, wherein said outer cover further includes an extended section at an end of said inner flange and substantially orthogonal to the inner flange.

11. The battery as defined in claim 1, wherein said container comprises a steel can.

12. A battery comprising:
    a conductive can for containing electrochemically active materials including positive and negative electrodes and an electrolyte, said container having a first end, an open second end, side walls extending between said first and second ends, and an end wall extending across said first end;
    an outer metal cover positioned across the open second end of said can, said outer cover having an outer peripheral flange, an inner flange, and a channel formed between the outer peripheral flange and the inner flange, wherein the channel receives the open end of the container such that the outer flange and inner flange are on opposite sides of the side walls of the can; and
    a seal disposed between the outer metal cover and the can, wherein said seal is compressed between the inner flange and the can and is compressed between the outer flange and the can.

13. The battery as defined in claim 12 further comprising a current collector electrically coupled to the outer cover.

14. The battery as defined in claim 13, wherein said seal has a central hub with an opening for receiving said current collector.

15. The battery as defined in claim 14, wherein said battery does not contain an inner cover disposed between the central hub and a peripheral wall of the seal for supporting the seal.

16. The battery as defined in claim 12, wherein said can further includes a rolled back edge formed at the open end.

17. The battery as defined in claim 12, wherein said outer metal cover further includes an extended section at an end of the inner flange and substantially orthogonal to the inner flange.

\* \* \* \* \*